A. C. SCHUERMANN.
NO-SLIP FLANGE.
APPLICATION FILED AUG. 22, 1913.
1,080,520.
Patented Dec. 2, 1913.
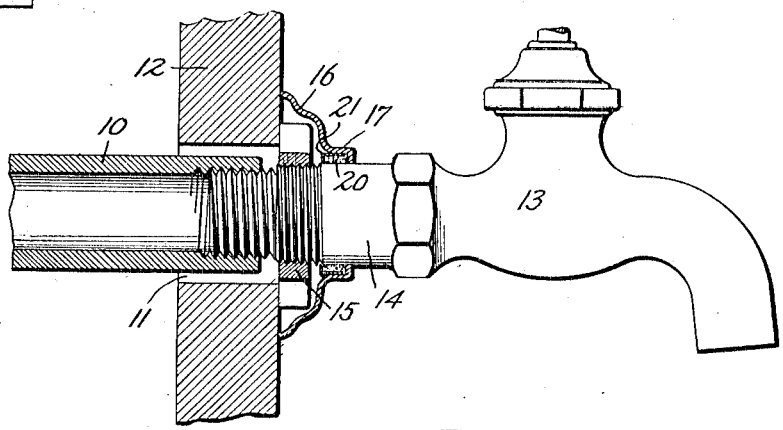
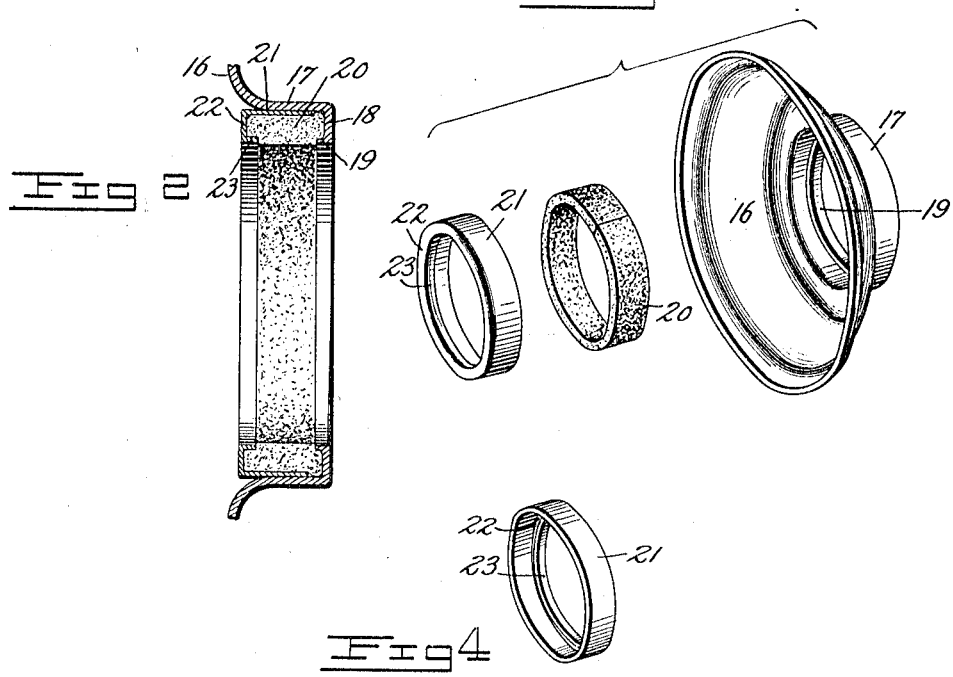
Inventor
Anton C. Schuermann
By Meyers, Cushman & Rea.
Attorney

UNITED STATES PATENT OFFICE.

ANTON C. SCHUERMANN, OF DECATUR, ILLINOIS, ASSIGNOR TO H. MUELLER MFG. CO., OF DECATUR, ILLINOIS, A CORPORATION OF ILLINOIS.

NO-SLIP FLANGE.

1,080,520.  Specification of Letters Patent.  Patented Dec. 2, 1913.

Application filed August 22, 1913. Serial No. 786,191.

*To all whom it may concern:*

Be it known that I, ANTON C. SCHUERMANN, a citizen of the United States, residing at Decatur, in the county of Macon and State of Illinois, have invented new and useful Improvements in No-Slip Flanges, of which the following is a specification.

This invention relates to flanges or canopies such as are employed to form a finish for pipes, faucets and the like that project from openings in walls, ceilings and floors, and has for its object to provide a flange of this type which is inexpensive and easy to manufacture; readily adjustable longitudinally on a pipe or faucet shank; and provided with frictional means for retaining the flange in adjusted position on said pipe or shank, the frictional action of said means being increased or lessened as desired to provide a suitable grip on pipes or shanks of slightly different diameters to hold the flange in place thereon to prevent it slipping.

In the accompanying drawing, Figure 1 is a vertical sectional view of the improved flange or canopy applied to the shank of a faucet. Fig. 2 is an enlarged detail sectional view of the outer or smaller end of the flange. Fig. 3 is a perspective view of the flange and the frictional means for holding the same on the pipe, separated. Fig. 4 is a perspective view of the retaining collar for the frictional device as viewed from the side opposite that shown in Fig. 3.

In the drawings, 10 indicates a service pipe projecting into an opening 11 in a wall 12 into the end of which pipe is screwed a faucet 13 on the shank 14 of which may be screwed a nut or collar 15 bearing against the wall 12 to prevent movement of said faucet and securing it rigidly to the wall.

Covering the nut 15 and the opening 11 in the wall is a flange or canopy 16 which forms a neat and attractive finish for the faucet and furthermore covers said opening and retaining nut as shown. For the purpose of holding the flange 16 in position against the wall, the outer, smaller end or neck 17 of said flange is made cylindrical for a suitable distance and then bent inwardly at right angles thereto to form a flange 18 the marginal edge of which is inwardly turned to form a short lip 19. Seated within the cylindrical neck portion 17 of the flange is a packing ring 20 of some fibrous or resilient material, such as felt, rubber or the like, the outer edge of said packing ring fitting against the flange 18 and being held in place by the lip 19. For the purpose of holding the packing ring within the flange a retaining collar 21 is provided of such diameter as to fit tightly within the cylindrical neck 17 of the flange. This collar is provided with a flanged portion 22 and a lip 23 similar to the corresponding portions on the flange 16, which engage the inner edge of the packing ring 20. The function of the lips 19 and 23 are to keep the packing ring in position and to keep the rough surface of a pipe or faucet shank from tearing the packing ring out of the flange when placing the same in position. In assembling the parts the retaining collar 21 is pressed into the cylindrical neck 17 of the flange sufficiently far to cause said packing ring to bulge or project beyond the lips 19 and 23 so as to bear upon a pipe or shank 14 of the faucet 13 with sufficient friction to hold the collar in any position into which it may be moved.

When a faucet as illustrated in the drawings is to be connected to a pipe in the wall, the flange 16 is placed on the shank 14 thereof and moved as far back from the threaded end as it will go and said faucet connected to the service pipe. If a nut or collar 15 is employed the latter is screwed tightly against the wall, after which the flange 16 is pushed forward until its base is in contact with said wall, covering the opening 11 therein, and also the nut 15, and providing a neat finish for the connection. If, on placing the flange upon the shank of the faucet said flange is found to fit the same too loosely, the retaining collar can be driven farther into the cylindrical neck 17 of the flange to cause the friction ring 20 to project and decrease its internal diameter, thereby providing an increased frictional connection between the flange and the shank of the faucet.

The flange 16 in the present instance may be made very cheaply and quickly by pressing or spinning sheet metal into the proper form and forming the retaining collar 21 also of sheet metal pressed into shape. The frictional ring 20 may be cut into proper lengths from a tube of suitable material or made from a strip thereof bent into circular shape with abutting ends as in Fig. 3.

What I claim is:—

1. A flange for encircling a faucet shank, pipe or the like and bear against a wall, formed with a projecting cylindrical neck through which said shank or pipe may pass and having an inturned marginal end, a yielding friction member seated in said cylindrical neck and bearing at one end against the inturned margin thereof, and a cylindrical collar in said neck and retained therein solely by frictional contact with the inner surface thereof, said collar having an inturned edge bearing against the other end of said friction member.

2. A flange for encircling a faucet shank, pipe or the like and bear against a wall, formed with a projecting cylindrical neck through which said shank or pipe may pass, and having an inturned marginal end terminating in a further inturned holding lip, a yielding friction member seated in said cylindrical neck and bearing at one end against the inturned margin thereof and held in place by said lip, and an adjustable cylindrical collar within said neck and retained therein solely by frictional engagement with the inner wall thereof, said collar having an inturned edge bearing on the other end of said frictional member, and a holding lip for grasping the same.

3. A flange for encircling a faucet shank, pipe or the like and bear against a wall, formed with a projecting cylindrical neck through which said shank or pipe may pass and having an inturned marginal end, terminating in a further inturned holding lip, a yielding friction member to engage said shank or pipe seated in said cylindrical neck and bearing at one end against the inturned margin thereof and held in place by said lip, and an adjustable cylindrical collar in said neck retained therein solely by frictional engagement with the inner surface thereof, said collar having an inturned edge with a holding lip for engaging the other end of said friction member, and adapted to be moved longitudinally in the neck to compress the friction member and cause it to hold more firmly on the shank or pipe, said collar being maintained in position after adjustment by its frictional engagement with the wall of said neck.

In testimony whereof I have hereunto set my hand in presence of two subscribing witnesses.

ANTON C. SCHUERMANN.

Witnesses:
LEONARD F. McKIBBEN,
CATHERINE E. McKEOWN.

---

Copies of this patent may be obtained for five cents each, by addressing the "Commissioner of Patents, Washington, D. C."